United States Patent
Bentall et al.

(10) Patent No.: US 6,411,629 B1
(45) Date of Patent: Jun. 25, 2002

(54) DATA INTERLEAVING METHOD

(75) Inventors: Mark Bentall, Blackwood; Philip Charlesworth, Caerwent, both of (GB)

(73) Assignee: Northern Telecom Limited, Montreal (CA)

( * ) Notice: Subject to any disclaimer, the term of this patent is extended or adjusted under 35 U.S.C. 154(b) by 0 days.

(21) Appl. No.: 09/222,557

(22) Filed: Dec. 29, 1998

(51) Int. Cl.$^7$ .............................................. H04L 12/43
(52) U.S. Cl. ...................... 370/458; 370/392; 370/395; 370/397; 370/522
(58) Field of Search ................................ 370/458, 338, 370/337, 347, 349, 395, 469, 441, 397, 522, 508, 392, 393, 394

(56) References Cited

U.S. PATENT DOCUMENTS

| | | | | |
|---|---|---|---|---|
| 5,404,355 A | * | 4/1995 | Raith ........................ | 370/95.1 |
| 5,434,855 A | * | 7/1995 | Perlman et al. ............ | 370/60.1 |
| 5,568,482 A | | 10/1996 | Li et al. | |
| 5,600,653 A | | 2/1997 | Chitre et al. | |
| 5,684,791 A | * | 11/1997 | Raychaudhuri et al. ..... | 370/278 |
| 5,987,018 A | * | 11/1999 | Freeburg et al. ............ | 370/345 |
| 6,151,312 A | * | 11/2000 | Evans et al. ................ | 370/338 |
| 6,157,642 A | * | 12/2000 | Sturza et al. ............... | 370/389 |
| 6,201,811 B1 | * | 3/2001 | Larsson et al. ............. | 370/395 |

OTHER PUBLICATIONS

IEEE Journal on Selected Areas in Communications, vol. 15, No. 1, Jan. 1997, "A Recommended Error Control Architecture for ATM Networks with Wireless Links" J Bibb Cain, Dennis N McGregor.

U.S. application No. 09/222,557, Bentall et al., filed Dec. 29, 1998.

\* cited by examiner

Primary Examiner—Wellington Chin
Assistant Examiner—M. Phan
(74) Attorney, Agent, or Firm—Lee, Mann, Smith, McWilliams, Sweeney & Ohlson

(57) ABSTRACT

Data packets are transmitted over a communications link in an interleaved manner. The link comprises a series of time-division multiplexed (TDM) frames, each frame comprising a plurality of time slots, a time slot being shorter than a data packet. Data packets are transmitted over a series of the TDM frames, one time slot in each of the series of frames being used to transmit a portion of that data packet. Different ones of the data packets begin in different TDM frames. Received data packets are allocated a modified header for use over the communications link. The modified header has a shorter address than the address in the received packet header and the modified header can be split into a plurality of parts which are distributed across the length of the transmitted packet. Error protection for the modified header can also be distributed across the length of the transmitted packet and is preferably spaced, within the transmitted packet, from the other parts of the modified header by payload parts of the packet.

32 Claims, 11 Drawing Sheets

DATA INTERLEAVING METHOD

TECHNICAL FIELD

This invention relates to a method and apparatus for transmitting data packets over a communications link, and in particular to transmitting the packets over a communications link which is subject to a high error rate, such as a wireless link.

BACKGROUND OF THE INVENTION

Wireless communication remains one of the most popular commercial methods for providing access and trunk communication mediums. With the recent launch of Low Earth Orbit (LEO) satellites, there are now many applications within commercial and military environments that may use terrestrial or satellite-based wireless communication links. The problem with wireless communication is that the fundamental error rates are significantly greater than those experienced in wireline systems. Wireless systems must cope with a harsher signal propagation environment which is subject to noise, interference, fading and delay. This is further compounded by the restrictions on the power levels at which wireless systems can operate. Mobile handsets and orbiting satellites are restricted in their transmit power by battery life, and wireless systems are generally constrained by regulatory limits on transmit power.

Wireless communication suffers errors within the traffic and the distribution of errors is uneven. The error rate has an underlying random independent bit error rate, overlaid by a burst error rate. It is possible to protect against a known random independent bit error rate with relative ease. Burst errors are more complex because they will corrupt large sections of data, and burst errors are particularly common where the communications signal is being interfered by repetitive pulses over a wireless link, or errors extended through transmission devices, for example, scramblers or modems.

Considering trunk communication, each trunk link will be used to carry several different types of traffic; the two most common traffic types being generally known as voice and data. Voice data can contain errors and still be understood to a reasonable quality due to the brain's ability to cope with noise. The key criteria of voice is that it cannot withstand large variations in delay. Data traffic, such as a file transfer, can tolerate extreme delays but cannot tolerate lost or corrupt information.

In general these two different types of traffic have been carried by different networks operating significantly different protocols. More recently Asynchronous Transfer Mode (ATM) has provided a common network protocol for these two traffic types. ATM has been designed to operate over low error rate trunk networks, which generally use reliable optical communication techniques, and assumes that the data traffic suffers a low error rate. It has therefore generally been considered unsuitable for wireless transmission.

The ATM protocol segments data into cells. Each cell contains 48 octets of user data and 5 octets of network information (header). The header of a cell contains virtual channel connection (VCC) information, i.e. address information which allows the network to route the cell. The VCC is made from a concatenation of the Virtual Path Identifier and the Virtual Channel Identifier. These two fields require 28-bits (3.5 octets) of information.

Some attempts have been made to adapt ATM for transmission over wireless systems.

U.S. Pat. No. 5,568,482 (Li et al., assigned to Yurie Systems Inc.) describes a low speed radio link system for ATM transport. An incoming stream of ATM cells intended for transmission over the radio link is segmented into a plurality of subframes, each subframe carrying a plurality of ATM cells and having additional framing bytes. One example uses nine subframes, each carrying five ATM cells. The structure of this protocol allows synchronisation to be more easily maintained under burst error conditions on the link.

U.S. Pat. No. 5,600,653 (Chitre at al., assigned to Comsat Corporation) describes a technique for improving ATM operation over a communications link with bursty bit errors. Interleaved cells are formed at the transmit end of the link by combining into each interleaved cell certain bits from each of plural different original ATM cells. Examples interleave the header parts of 40 different cells to generate interleaved cells. Interleaving cells together is a technique that requires all of the information to be received and interleaved before transmission, e.g. all the ATM cells required to fill an interleaving frame will be stored within a device before transmission can begin. This results in a delay in constructing the interleaved set of cells and requires processing and storage. This is a general problem with interleaving in this manner. For example, a 30-cell interleaving frame operating between ingress and egress interfaces at 1.92 Mbps will require 6.625 msec to create the frame and a further 6.625 msec to transmit the frame.

Another problem with ATM is the cell delineation process that is used to synchronise the receiver to the ATM cell boundary. It is known to use a state machine having three states to search for a correct header. However, if any one header suffers two bit errors then the receiving device will not be able to determine the correct destination for the cell and will delete the cell. Therefore, a 2-bit error in the cell header causes complete loss of the cell, i.e. a 384-bit data error. This will occur with a probability of 0.1 over a stream of cells since the header is approximately one tenth of the bandwidth. A paper by K. L. Li, J. H. Kim and Y. H. Low entitled "Adapting ATM in low speed environments" attempts to solve this problem by allocating multiple redundant addresses which effectively sets up multiple virtual circuits to the same destination. The most probable error patterns in the address field will change the original address to another address which can be uniquely identified as the original address.

There are other problems with the cell delineation process associated with the amount of time it requires to establish and lose synchronisation.

The present invention seeks to provide a more reliable method for transmitting data packets over a communications link, such as a wireless link.

SUMMARY OF THE INVENTION

According to a first aspect of the present invention there is provided a method of transmitting data packets over a communications link in an interleaved manner, the link comprising a series of time-division multiplexed (TDM) frames, each frame comprising a plurality of time slots, a time slot being shorter than a data packet, the method comprising:

receiving data packets for transmission over the link;

for each data packet, transmitting the data packet over a series of the TDM frames, one time slot in each of the series of frames being used to transmit a portion of that data packet.

By interleaving the packets, burst errors are distributed across several channels, each channel suffering a level that can be corrected by a higher level protocol. This allows the traffic to pass with limited, or no additional protection requirements. An advantage of this method is that a significant number of packets is not delayed to form an interleaving frame. The allocation of data packets to the time slots in a TDM frame provides a suitable interleaving effect. The following description refers to this improved resilience to errors as link hardening.

Preferably each data packet is transmitted in the same time slot in each of the series of frames.

Preferably a received data packet is transmitted as soon as there is a free time slot in a frame, such that different ones of the data packets begin in different TDM frames. This has the advantages of not needing to wait for a batch of received cells before performing interleaving, as in the prior art, since the TDM structure provides the interleaving effect. This also minimises storage requirements at the transmitting entity.

The VPI and VCI fields in an ATM cell header require 28 bits (3.5 octets) of information. However, these $2^{28}$=268 million addresses will not be used at the same time on one link. Therefore bandwidth can be gained on the communications link by sending a header that supports fewer addresses. An 8-bit address field permits 256 different addresses. This header is associated at both ends of the link such that the original header can be removed, the packet is associated with one of the 256 available channels, and the original header is reconstructed at the far end. By doing this some bandwidth is gained which can be used to improve the quality of the link. A shortened header is less likely to suffer an error, and the additional bandwidth that is gained by using a shortened header can be used to increase error protection for the header. Other numbers of bits can be used for the shortened header depending on the number of addresses that are needed for the link and the level of bandwidth saving that is required.

Preferably the modified header is split into a plurality of parts which are distributed across the length of the transmitted packet. This has an advantage that the header is more resilient to burst errors, because a burst will need to have a longer duration if it is to corrupt all of the distributed sections of the header.

Preferably error protection is included for the modified header and the error protection is distributed across the length of the transmitted packet. The error protection can comprise error detection and error correction. Preferably the header error protection is spaced, within the transmitted packet, from the other parts of the modified header by payload parts of the packet.

Preferably the transmitted packet includes synchronisation information to allow a receiving entity at a receiving end of the communications link to determine boundaries between transmitted packets on the link. This has the advantage of allowing the receiving entity to determine if a cell is present on the link, without using the packet address. Preferably the synchronisation information is distributed across the length of the transmitted packet.

Preferably the frames include synchronisation information, and the position of the synchronisation information is varied within the frames. If the synchronisation information is allocated to a time slot that should be carrying a portion of a data packet, that portion of the data packet is moved to occupy a predetermined alternative time slot within the frame. This alternative slot can be the first or last time slot in each frame, or some other position which is known by both ends of the link.

A further aspect of the invention provides apparatus to implement this method.

While the described method is particularly suited to use on a wireless communications link which is subject to high error rates, it will be appreciated that the method can also be used on other forms of communication link, such as wired links.

The following description refers to carrying ATM cell-based traffic over a communications link. However, it will be appreciated that the invention is not so limited, and encompasses other packet, cell or frame based transport mechanisms.

Preferred features may be combined as appropriate, and may be combined with any of the aspects of the invention, as would be apparent to a person skilled in the art.

BRIEF DESCRIPTION OF THE DRAWINGS

For a better understanding of the invention, and to show by way of example how it may be carried into effect, embodiments will now be described with reference to the accompanying drawings, in which.

DESCRIPTION OF PREFERRED EMBODIMENTS

The interleaving system has been developed to:

Improve delineation of the payload

Improve resilience to burst errors

Reduce common synchronisation patterns which are prone to threats

Utilise gains in bandwidth to improve data throughput.

This section describes the Protocol Link Adapter providing functions to improve protocol delineation and addressing resilience for use with transmission over poor quality bearer services. The term "Protocol Link Adapter" is used to describe a device that provides functions to adapt higher-layer protocols to meet specific requirements. Throughout this description an ATM Link Adapter will be used as a specific example of a possible implementation.

Figure 1:
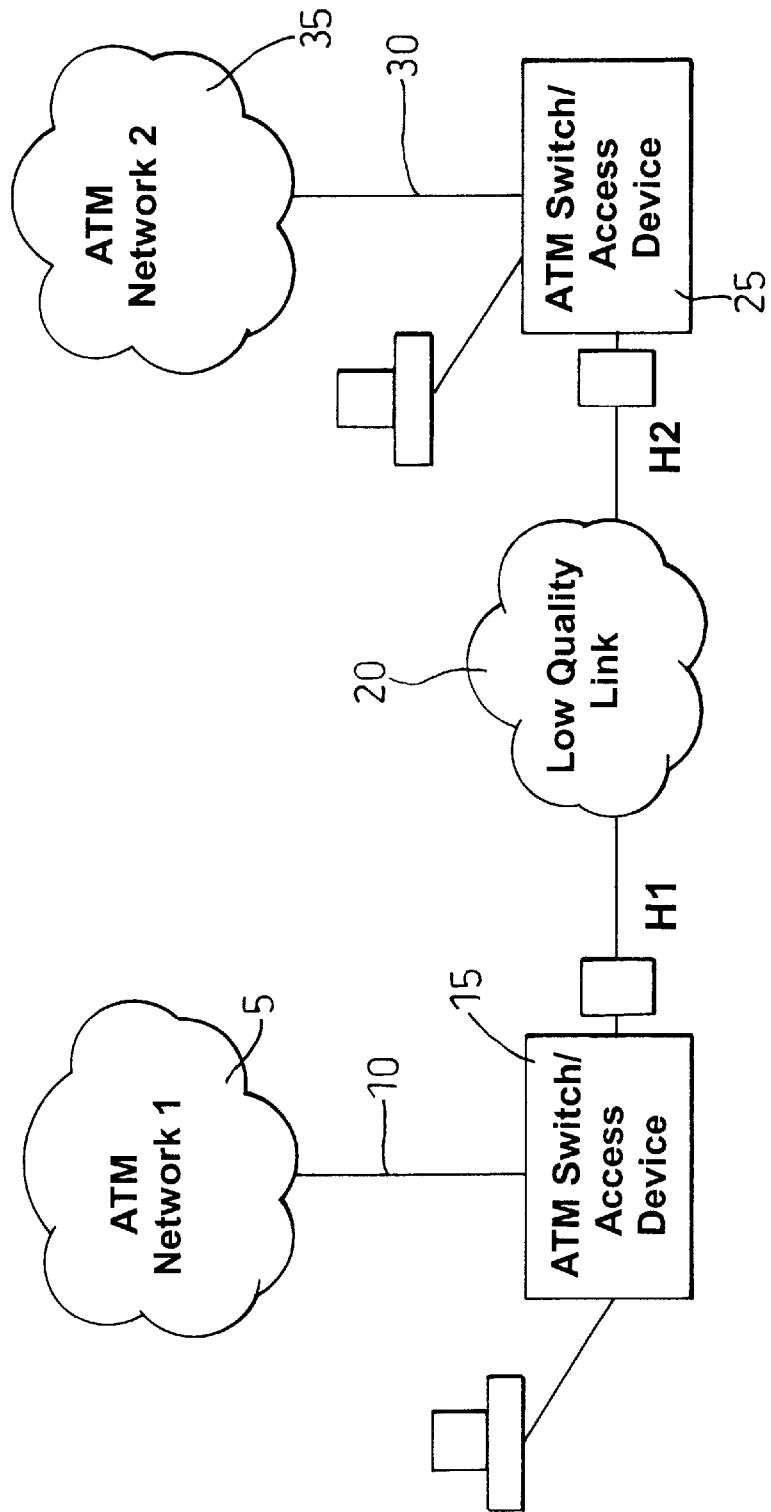
FIG. 1 shows an example. communications system in which a link hardening scheme can be used.

FIG. 1 shows an example of the preferred apparatus in the context of a communications system which carries ATM traffic. A first ATM network 5 and a second ATM network 35 are linked by ATM links 10, 30, ATM switch or access devices 15, 25 and an intermediate low quality link 20. The low quality link can be a wireless link such as a terrestrial point-to-point or satellite link. ATM link adaptation devices H1, H2 are located either end of the low quality link. Each device H1, H2 interfaces with standard ATM interfaces on devices 15, 25. This allows maximum flexibility since the method used over the low quality link may be proprietary. The adaptation device operates a link hardening method that retains the flexibility of standard ATM protocols, providing seamless communication between the two ATM networks or local devices either end of the link, and also improves reliability of transport across the low quality link 20.

The purpose of the link hardening method is to improve the delivery of the ATM cells across the low quality link 20. Another objective is to minimise the increase in overhead associated with the link adapter. Minimising the overhead will enable the two switches, either side of the low quality link, to use a large portion of the overall available bandwidth to carry useful payload data.

Figure 2:
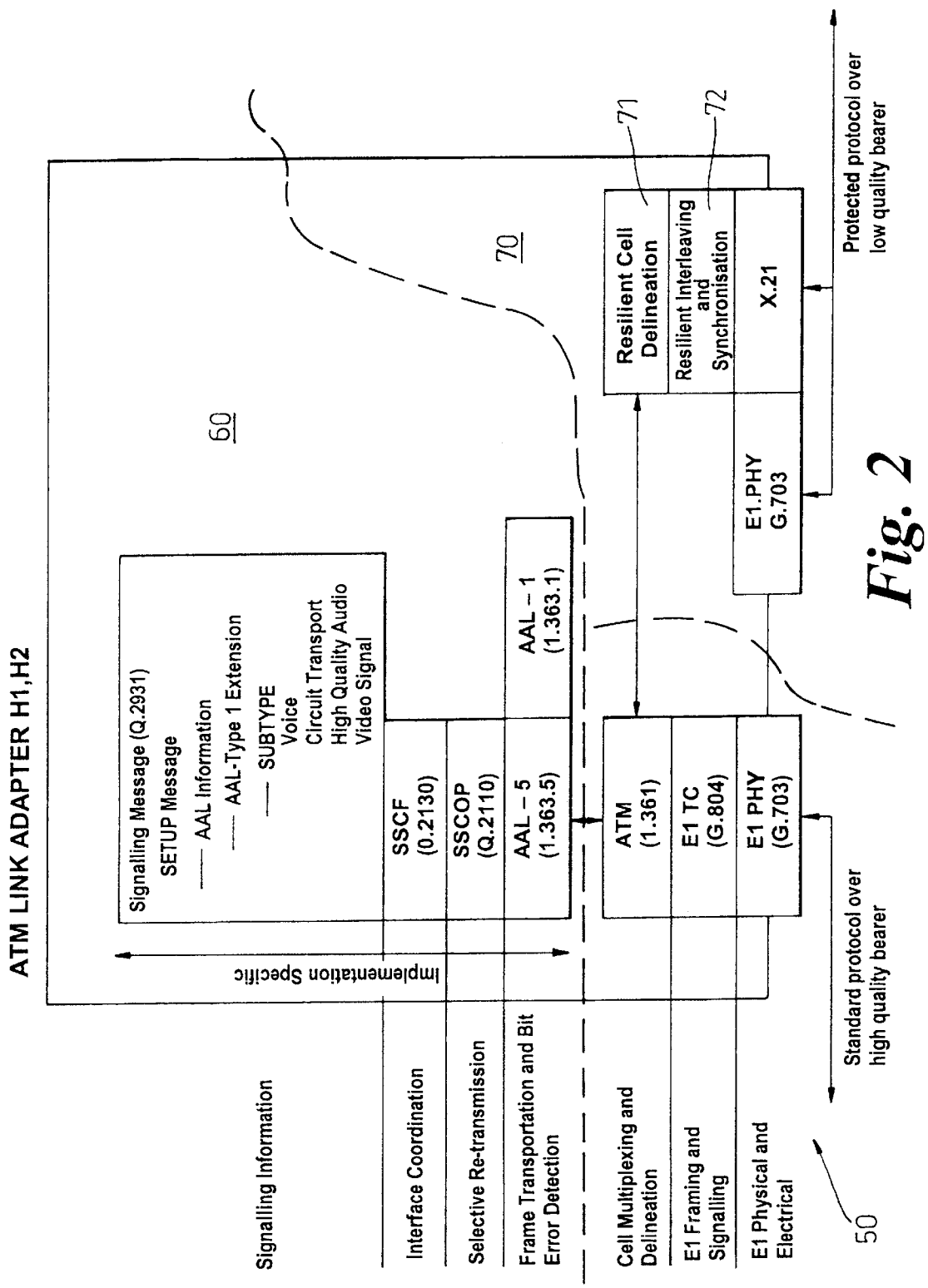
FIG. 2 shows how the link hardening scheme can be fitted into a communications model.

FIG. 2 shows the ATM adapter divided into functional components with the associated standards where applicable. The functional components are shown in an ISO-OSI layered architecture. Region 50 shows the levels required to terminate an ATM cell stream from a standard E1 bearer encapsulated ATM trunk (such as would be used on link 10, 30 in FIG. 1.) Region 70 of the device shows the resilient cell generation 71 and TDM multiplexing structure generation 72 over an X.21 or G.703 bearer, such as would be used on link 20 in FIG. 1. Region 60 refers to services in the model, and by way of an example of higher layer services FIG. 2 shows the ATM signalling service and its associated protocols. The access to the signalling protocol provides the ability for the device to monitor specific call requests, should this be required.

Unlike other interleaving methods, this method does not delay a significant number of packets to form an interleaving frame. Instead, data is interleaved into the structure as time slots become available.

The main sections of the link adapter are located in the "Resilient Cell Delineation" 71, and "Resilient Interleaving and Synchronisation" 72 blocks in FIG. 2.

Figure 3:
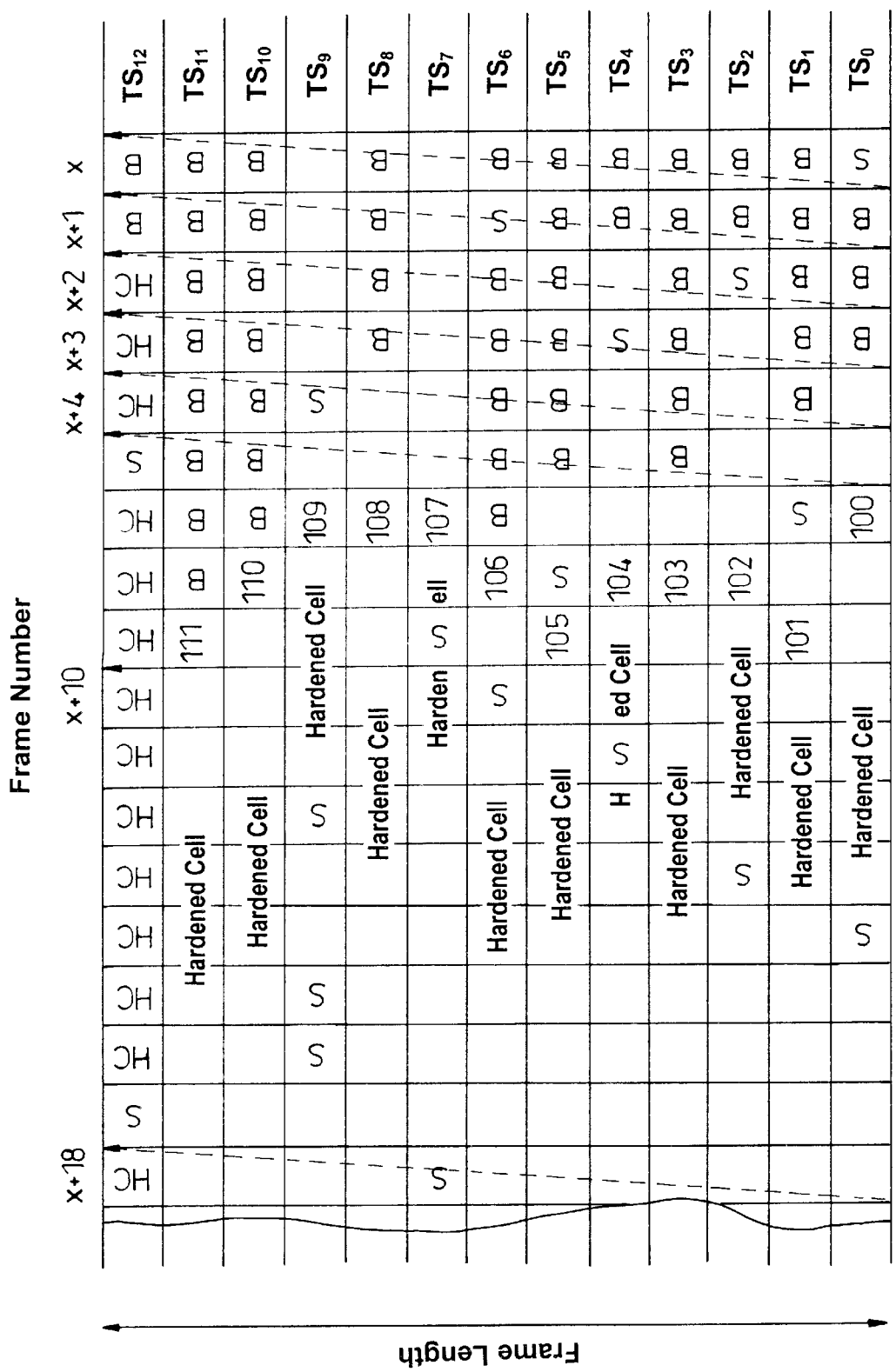
FIG. 3 shows a framed structure for use in the link hardening system.

FIG. 3 shows a preferred form of the interleaved structure used on link 20. A slotted frame is used, as is typical of Time Division Multiplexed (TDM) systems. However, the present protocol does not dedicate one or more time-slots to a service but instead it provides a means to interleave a higher level multiplexing method such as ATM, frame-relay or other proprietary systems. FIG. 3 shows a series of frames x, x+1, . . . x+18 which are each sub-divided into a plurality of time slots $TS_0$, $TS_1$, . . . $TS_{12}$. The order of transmission is frame x, $TS_0$–$TS_{12}$; frame x+1, $TS_0$–$TS_{12}$; through to frame x+18, $TS_{12}$. Cells arriving at the ingress interface are allocated a free slot in the structure and begin transmission at the egress interface immediately. This provides a continuous interleaving structure. This reduces the delay in processing packets because a group of packets are not delayed to form an interleaved packet. The transmission structure itself provides the interleaving effect.

Referring again to FIG. 3, each cell has a longer duration than a time slot on the link. A cell is transmitted across a number of frames, with the cell occupying the same time slot for the duration of the transmission period across the frames. Considering cell 108, transmission starts during frame x+4, $TS_8$ and continues during $TS_8$ of subsequent frames. Other cells are transmitted during other time slots, e.g. cell 107 during $TS_7$, cell 109 during $TS_9$. Different cells begin during different frames. This arises because cells received by the link adapter are allocated to an available time slot at the time of receipt without undue delay. The combination of having different cells occupying different time slots and different cells starting during different frames provides an effective interleaved structure. Considering a burst error during the entire frame x+4, this will affect one small portion of each of the cells 100, 102, 104, 107, 108 and 109. Error protection within each of the affected cells should be able to cope with the loss of one portion of the cell. Furthermore, because different cells begin at different times, different parts of the cells will be affected. There is a reduced risk that the burst error will affect the header parts of all of the cells, instead, it is likely that the header parts of only some of the cells will be affected.

The selection of the symbol size, i.e. the quantity of information taken from each interleaved unit, e.g. ATM cell, is selected to provide the greatest resilience to the higher multiplexing scheme and generally to the layer where error correction is performed. For example, if a higher layer error correction algorithm has a symbol size of octets, i.e. it can only replace whole octets, then it is advantageous to interleave the cells at the octet level. This means that each time slot in the TDM structure carries one octet of a packet. It will be appreciated that interleaving can be performed with smaller or larger sized parts of packets.

The structure in FIG. 3 also shows blank octets B and synchronising octets S.

Interleaving Frame Synchronisation

The continuous interleaving frame is synchronised between nodes at either end of the link 20. There are many ways in which this can be achieved and, generally, one slot will be given to carry synchronisation information. A good example of a synchronisation scheme is used for primary rate ISDN services specified in ITU-T G.704. The scheme uses a single slot of a 32-octet frame to carry CRC checks, synchronisation and end-to-end information across the link. The information sequence is spread across 16-frames but always in the same timeslot. Alternatively, as shown in FIG. 3, the synchronisation information is placed in different time slots in different frames. It may be necessary to place the synchronising information in time slots which are allocated to carrying parts of the hardened cell payload. In this case, that part of the cell payload is moved to a fixed, predetermined alternative location in the frame. These are represented by the HC (hardened cell) octets in FIG. 3. For example, frame x+4, $TS_9$ carries a synchronising octet. The part of the cell that would have been carried in that time slot is moved to $TS_{12}$.

The content of the synchronisation octets can be based on an existing synchronisation scheme, such as the G.704 E1 synchronisation scheme.

Sub-Slot Transportation

The requirements within a slot will now be considered. Assuming that the interleaving scheme has been established and is synchronised to the receiving adapter, then for every slot there are two possible states. The slot may be dedicated to transporting information, e.g. interleaving an ATM cell, or it is possible that the slot will not be in use, i.e. it will be a free slot. Therefore a method is required to establish, at the receiving device, if the data present in a slot is part of a higher-layer multiplexing scheme or if it is a free slot. It is also a requirement of the inter-slot scheme to establish the beginning of an information element. To meet successfully these two requirements it is likely that the methods used differ, depending on the higher-layer scheme used.

Although the HEC is part of the ATM cell, it is generated and inserted on transmission and checked and removed on reception by the physical layer. The HEC provides error correction/detection and allows the physical layer to detect the cell boundaries within the lower level frame. Detecting cell boundaries in what is initially just a stream of bits is known as cell delineation. Thus the HEC performs two functions: it allows bit errors in the header to be detected, and sometimes corrected, and it allows the physical layer to detect the ATM cell boundaries.

Figure 4:
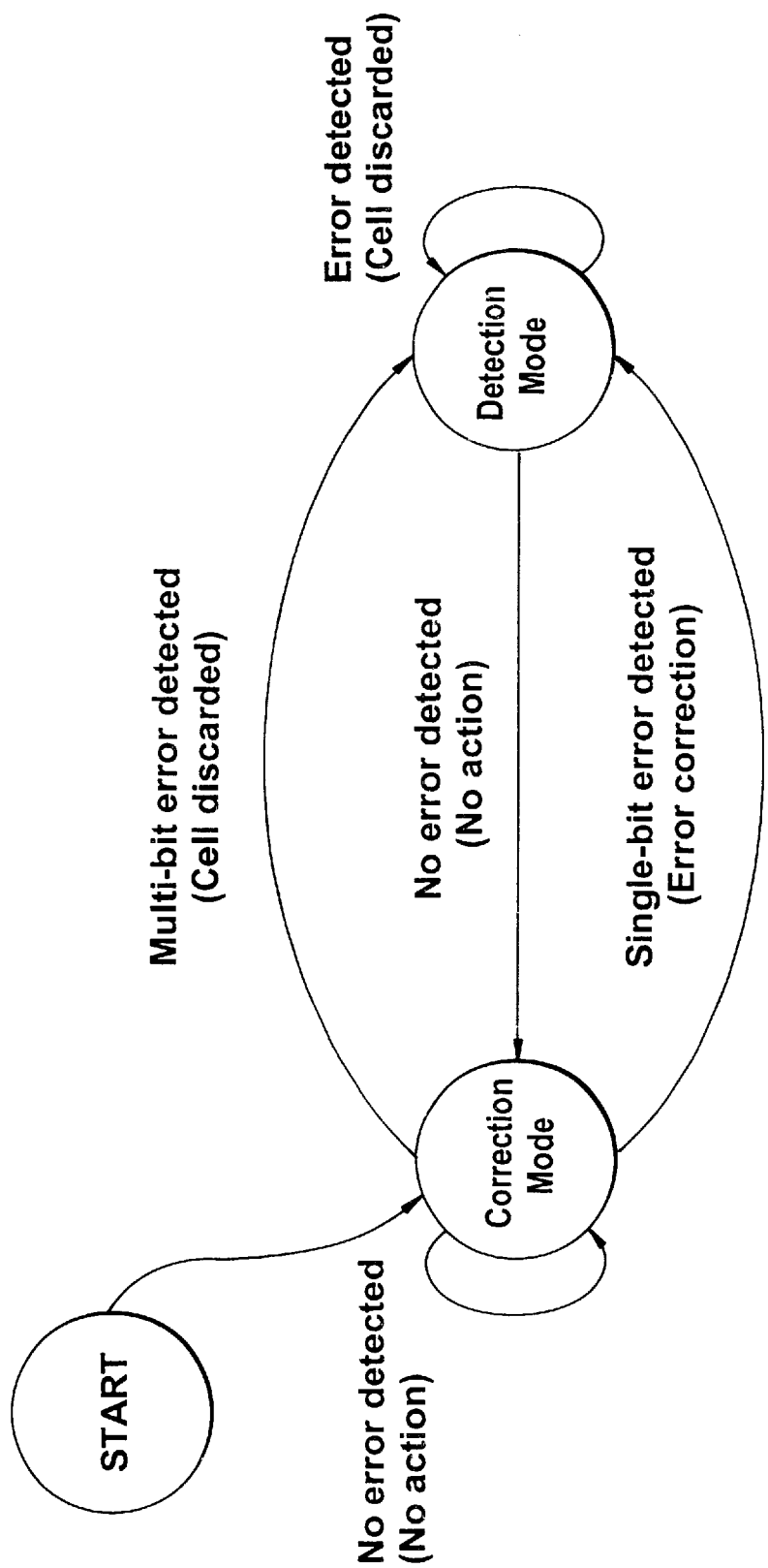
FIG. 4 shows an error-detection state model used in an ATM system.

Header error correction/detection works on a two-state model as shown in FIG. 4. Because the number of bits used for the HEC field is high (8 bits) in comparison with the number of bits being protected (4×8=32 bits), single bit error correction can be performed. Initially the system is in a mode where it will correct single bit errors and it remains in this mode until an error of some form is detected. The probability of detecting a multiple bit error whilst in the correction-mode state is lower than in the detection-mode state. When an error is detected in the correction-mode state, the HEC algorithm switches to the detection state. The HEC algorithm switches back to the correction state only when an error-free cell has been received. The HEC field is an 8-bit cyclic redundancy check (CRC) code.

Figure 5:
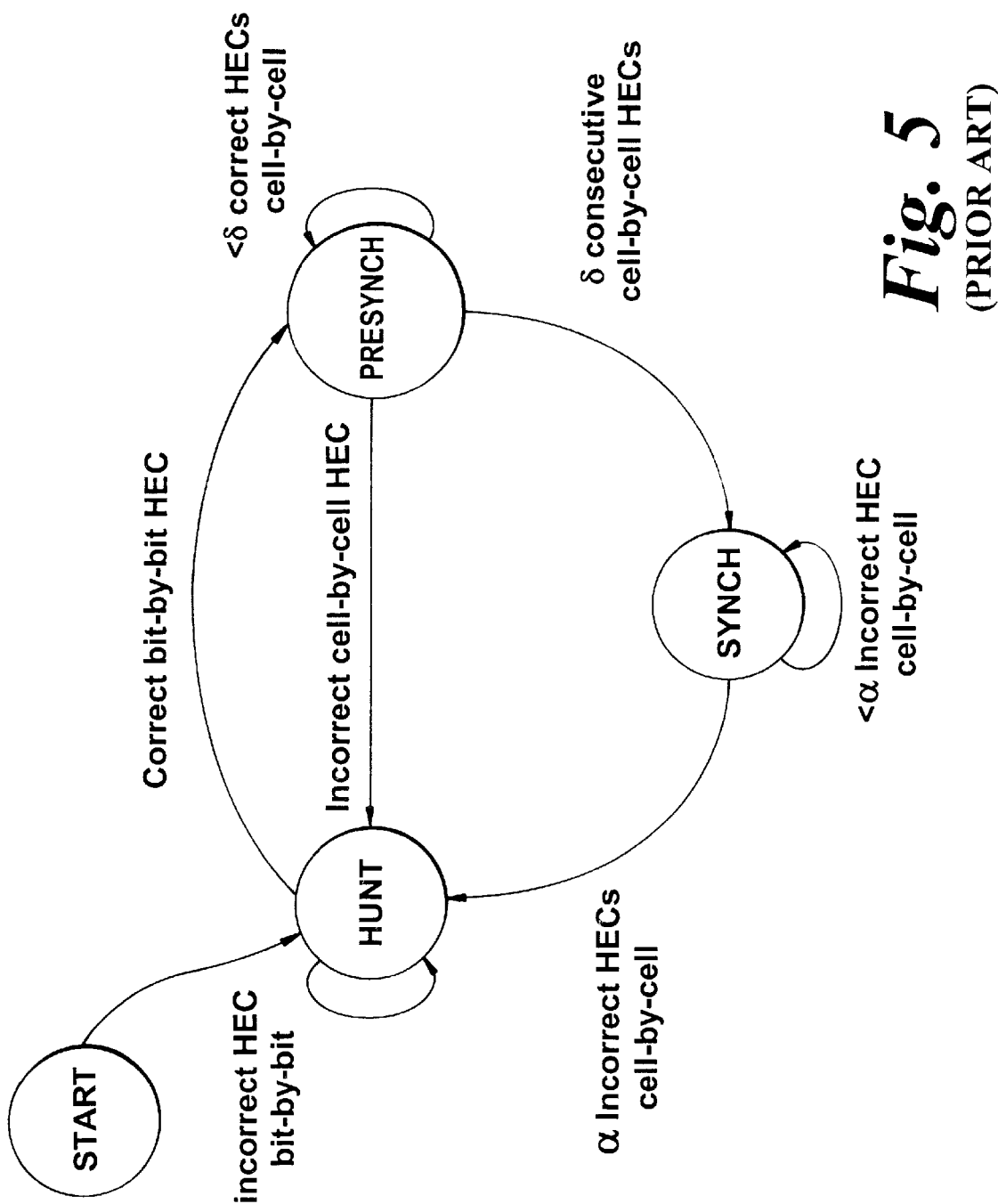
FIG. 5 shows a synchronisation state model used in an ATM system.

ITU-T recommendation I.432 provides the mechanism to identify cell boundaries within the lower level ATM frame. The basic technique is to hunt for a correct CRC, moving along the bit stream until one is found. Even then it cannot be guaranteed that the correct start-of-cell has been found, as the user information inside the cells might be such that it gives a correct CRC at the wrong point purely be chance. A three-state algorithm, as shown in FIG. 5, begins by monitoring the unsynchronised incoming bit stream and performs CRC error detection with the HEC polynomial until no more errors are found. This is known as the HUNT state. When the CRC is valid, then it is highly probable, but not certain, that the cell header has been found. The algorithm the n switches to the PRESYNCH state where it performs HEC error detection on a cell-by-cell basis. If the HEC fails, the algorithm reverts to the hunt state on the assumption that it found a false start-of-cell. Two parameters, 6 and a are used in the delineation process. Provided that the PRESYNCH state correctly identifies 6 consecutive HECs, the system is synchronised and moves to the SYNCH state. Until synchronisation is lost the normal two-state HEC algorithm applies. Lost synchronisation is determined by a consecutive incorrect HECs. The values of $\delta=7$ and $\alpha=6$ are often used.

The delineation scheme is intended to be used with a continuous stream of cells. To implement such a scheme within a slotted structure would require blank cells to be inserted whenever a slot is free. This would cause the free state to last for a transmission period equal to a cell, preventing data cells from being transmitted as soon as possible. If the blank cell was replaced by a blank octet then the cell delineation scheme could not establish cell synchronisation in the usual manner. Assume that the header search algorithm would run for one cell only by means of the cell's CRC. In a high error rate environment there would be a $2^{-8}$ chance that the CRC would appear correct and there would be no other means by which this could be checked. Depending on the environment this style of scheme may not provide a robust means of delineation. It is also important to note that if the ATM cell header is corrupt, other than by a single bit error, the entire payload will be discarded. Therefore, for ATM it is important that the addressing and synchronisation issues are redesigned to provide greater flexibility and resilience.

Figure 6A:
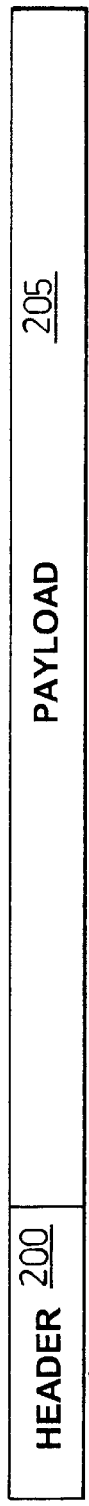
FIG. 6 shows various packet structures.
Figure 6B:
Figure 6C:
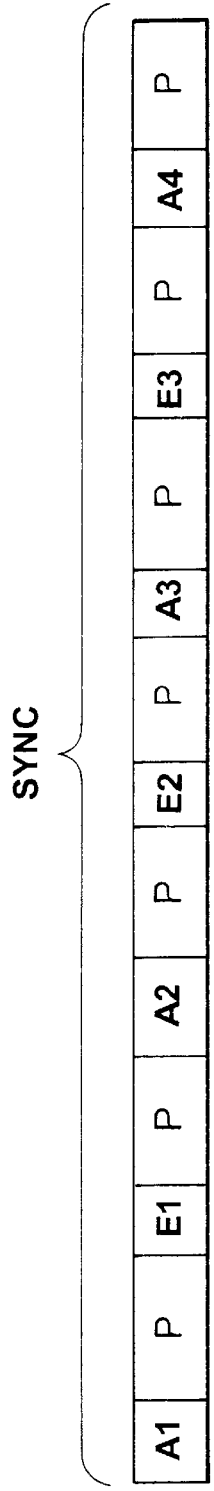

FIG. 6 shows various formats for a data packet. Firstly, (a) shows a conventional format of a data packet, such as an ATM cell, with a header part 200 preceding a payload part 205. The header part 200 of the cell carries an address for routing the packet and error protection for the address. Secondly, (b) shows an improved format for the packet. The header is divided into a number of parts—in this example four parts HE1, HE2, HE3, HE4 are distributed along the length of the cell. By distributing the header parts, the cell is more resilient to burst errors. Preferably the loss of any one of the header parts can be suffered and corrected. Lastly, (c) shows another improved format for the packet. The address field of the header is divided into a number of parts (A1, A2, A3, A4) and the error protection for the address field is divided into a number of parts (E1, E2, E3). Each of these parts is distributed along the length of the packet, and the address and error protection parts are separated from one another by payload parts of the packet. Furthermore, a synchronising code, which can be used to delineate the packet, i.e. determine the beginning and end of the packet, can also be distributed along the length of the cell. This further increases resilience to burst errors.

ATM Addressing Scheme

Figure 7:
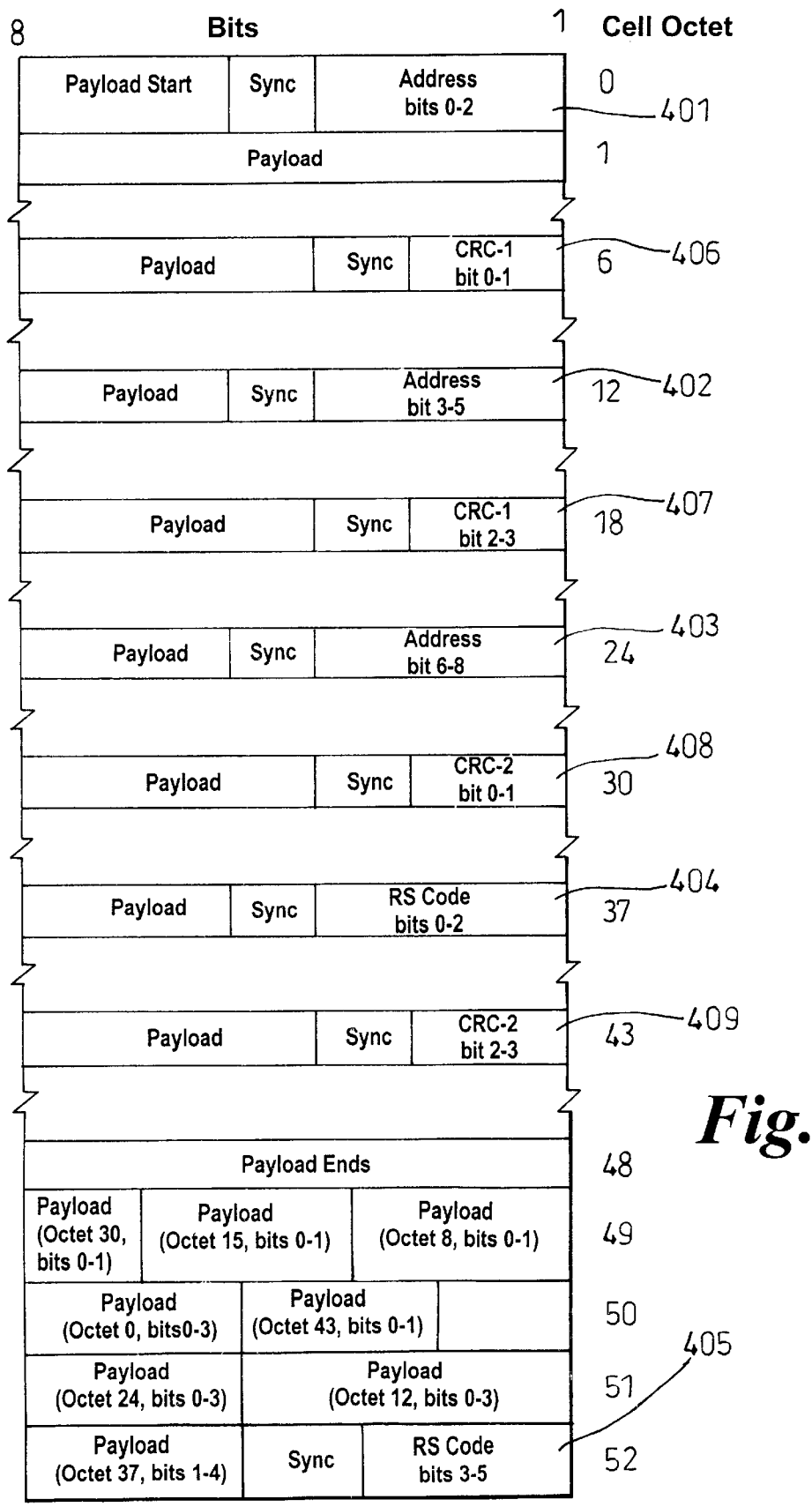
FIG. 7 shows an embodiment of a packet structure to carry an ATM cell.
Figure 8:
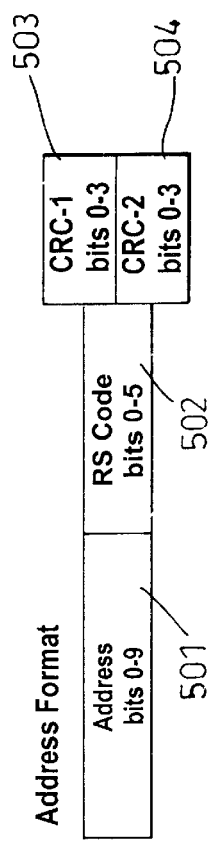
FIG. 8 shows the modified packet header of FIG. 7 in more detail.

An ATM cell has a modified form while it is carried over the low quality link. The original ATM header is modified to include a shortened address, the spare octets saved by the address being used to carry additional error protection for the header. The header is also distributed along the length of the cell to offer better protection against burst errors. As shown in FIG. 8, the modified header comprises a shortened address field 501, error correction (RS code) 502 and one or more error detection parts 503, 504. FIG. 7 shows a preferred way of transmitting an ATM cell. A modified header is split into a number of segments and the segments are distributed across the length of the cell. Considering the ATM cell payload, i.e. 48 octets without the ATM cell header, the payload can be divided in to 4 segments of 12 octets. A segment of the new addressing (header) scheme is located at each 12-octet boundary of the cell, starting with the first octet, giving 4 address segments. A fifth segment of the address (header) can be placed within a new overhead area at the end of the cell. FIG. 7 shows segments 401, 402, 403, 404, 405. Error detection information 406, 407, 408, 409 is inserted into the cell at other positions, separated from the segments of the address by parts of the payload.

By using a shorter address range consisting of 9 address bits and 6 Reed-Solomon bits, based on a symbol size of 3, the addressing scheme can correct any one lost address segment. With an interleaving depth of 32, a burst error will have to last 1.5 msec to destroy any two address segments of a single cell, since the interleaving structure will place the parts of the cell carrying these two address segments 12 frames apart. Provided only one segment is lost then the other segments of the address can re-create the corrupt segment. The Reed-Solomon error correction may incorrectly correct the new address if a single bit error occurs within one or more segments. An additional CRC can be used, as shown in FIG. 8, to provide additional protection to the addressing scheme. Since the loss of a single CRC bit would invalidate a correct address, the CRC scheme is divided into two independent 4-bit CRC schemes, located and distributed separately. Provided one of the two CRC codes is correct the address is accepted as valid.

Cell Synchronisation

The new addressing scheme provides a greater resilience with respect to the standard ATM addressing scheme. A mechanism translates the original ATM address to the new address which is used on the wireless link. This scheme should not be used to provide a means to determine cell delineation because it relies on the detection of a correct cell header, which we have already established is likely to require correction.

The synchronisation scheme is a trade-off between the acceptable amount of information required to ensure a correct detection of the synchronisation means and bandwidth. The scheme described here is one of many possible implementations and uses a 9-bit synchronisation pattern, distributed throughout the cell. The pattern allows for a single bit error in one of the synchronisation bits, therefore allowing the system to suffer a burst error of the distance between two synchronisation bits.

Since the synchronisation algorithm is distributed throughout the cell, it is preferred that the octet stream is stored for the minimum of the distance between two synchronisation octets to back trace late detection of synchronisation. The scheme shown in the ATM cell above is not necessarily the most resilient since it only provides that same protection as ATM. Nevertheless it is one of the most efficient implementations, offering ATM style performance. Also, the scheme is flexible enough to allow an increase in synchronisation bits to increase synchronisation resilience. The location of the synchronisation bits is shown in FIG. 7.

Signalling

A signalling system manages the assignment of the VPI/VCI numbers of received ATM cells to the more restricted set of channel numbers that are used on the low quality link.

The signalling mechanism has the following functions:

Ensures unique assignment of channel numbers at both ends, thereby ensuring that the correct VPI/VCI is allocated to a cell at the far end of the low quality link for onward transmission of the cell.

Resolves conflicting assignments of channel numbers.

Is self protecting to a higher level than the data

A preferred scheme requires no acknowledgement messages before assigning channel numbers as this introduces delays, particularly on satellite links.

Signalling messages establish the association between the channel number with the ATM cell VPI/VCI. They also have a short section to carry messages for management purposes, e.g. identifying and resolving allocation conflicts. One nominated channel can be used for signalling, for example channel h00.

Some spare signalling codes can be reserved for future expansion. These can be used for increasing the flexibility of the process, for example adaptation of coding schemes in response to automatic measurement of error rates. A 4-bit message length allows 16 messages, which should suffice for most purposes.

Figure 9:
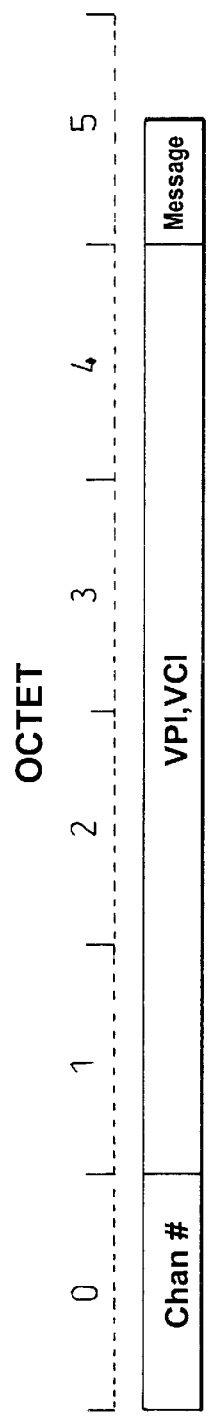
FIG. 9 shows a signalling message format.
Figure 10:
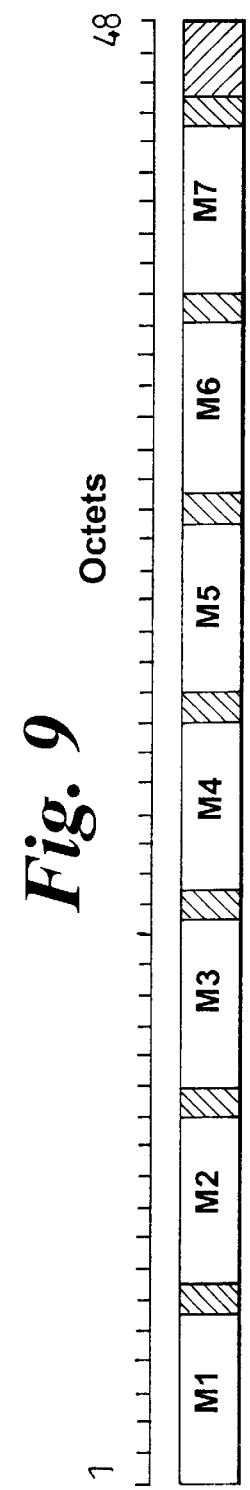
FIG. 10 shows a way of transmitting a group of signalling messages.

One message structure is shown in FIG. 9. A 5½-octet message comprises a one octet channel number, i.e. the shortened address that will be used over link 20, a four byte VPI/VCI of the ATM cell (associated with the channel number) and a ½ octet management message. It is advantageous to pack signalling messages into a cell sized carrier. A possible structure for the cell-sized block is shown in FIG. 10. Each signalling message is followed by error protection for that message, and the group of messages is followed by error protection which protects the group of messages. This structure protects the messages and matches the length of the signalling messages with the ATM cells.

Signalling Exchange

Figure 11:
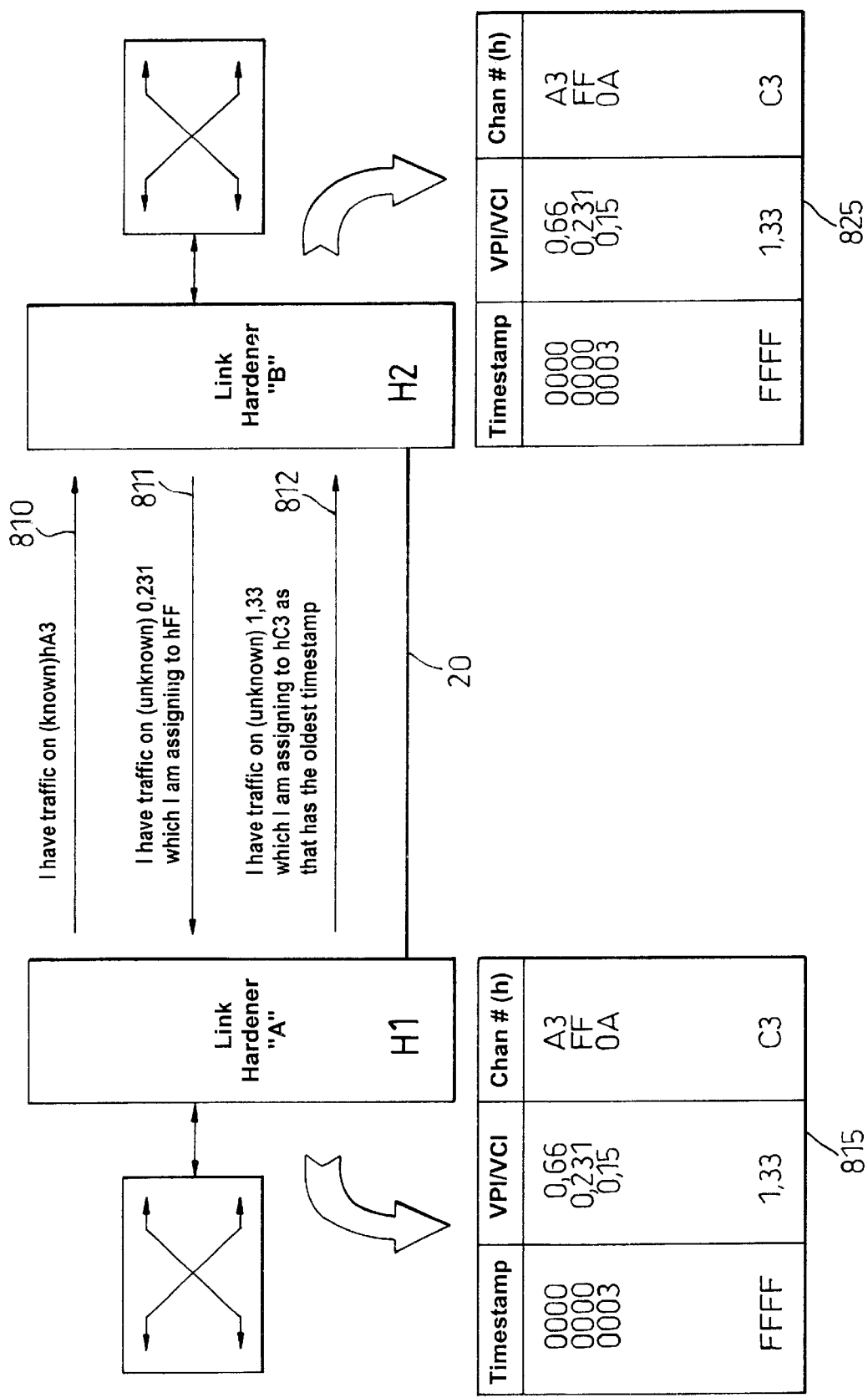
FIG. 11 shows one aspect of the signalling in the system of FIG. 1.
Figure 12:
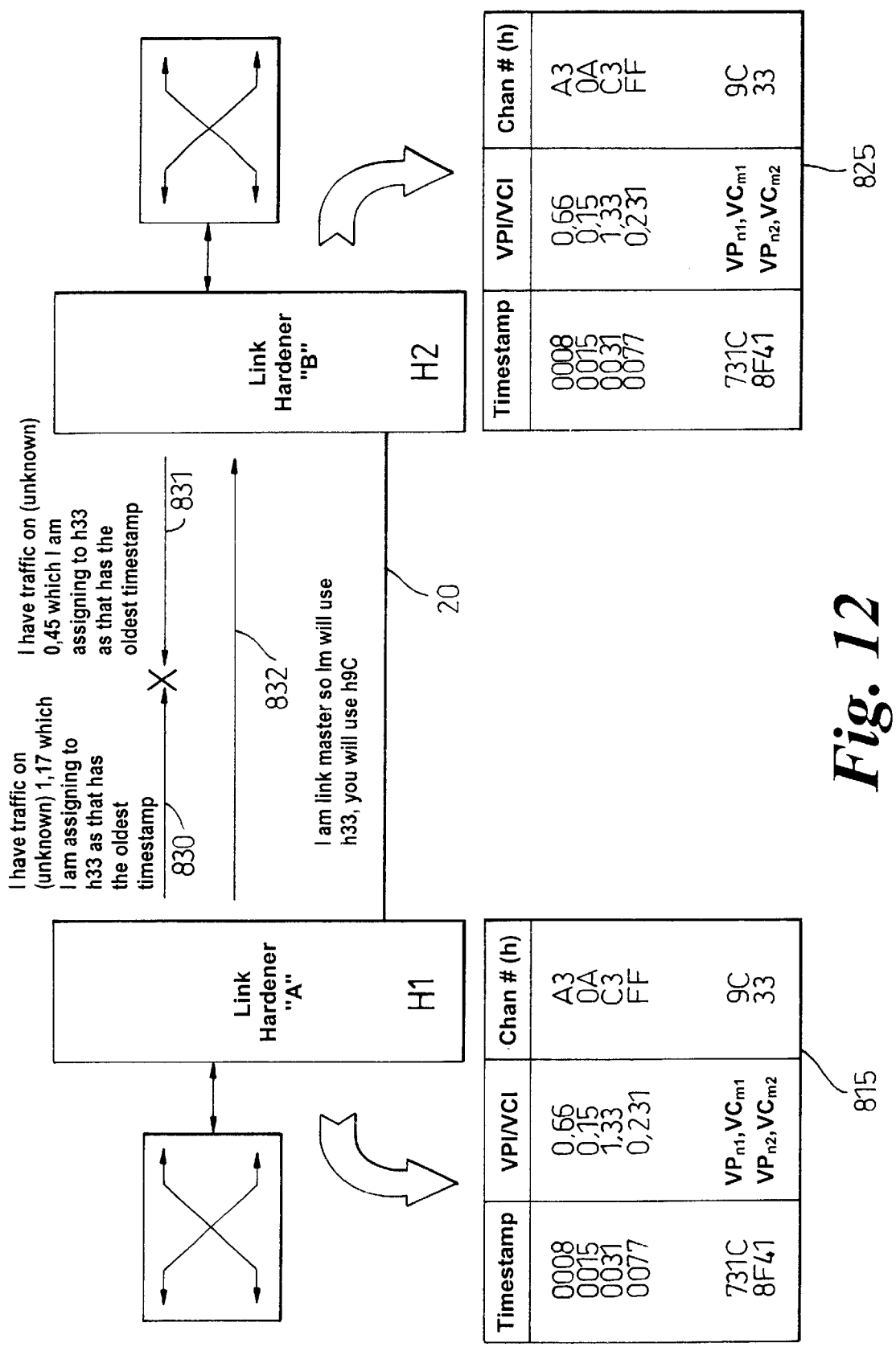
FIG. 12 shows another aspect of the signalling in the system of FIG. 1.

Signalling exchange between entities at each end of the low quality link will now be described with reference to FIGS. 11 and 12. FIG. 11 describes the method for allocating channel numbers to ATM cells for use over link 20. Link hardener entities H1, H2 at respective ends of link 20 each maintain a table of information 815, 825. The tables list the associations between VPI/VCIs of ATM cells and channel numbers which are used on link 20. Table 815 shows that ATM cell with the VPI/VCI 0,66 has been allocated channel hA3 for use on link 20. Each entry in table 815, 825 has a timestamp which is updated each time that association is used.

When entity H1 receives an ATM cell, it is allocated a channel number. Upon receiving an ATM cell, entity H1 refers to table 815 to check whether there is an existing association between the VPI/VCI of the received cell and a channel number. If so, that channel number is used again for this new cell over link 20. The timestamp is updated to record this recent use of the VPI/VCI—channel number association. Entity H1 signals to entity H2 that it has a cell with address hA3, in step 810, by sending a cell with the shortened address. Upon receiving this cell, H2 refers to its table 825 to find the full VPI/VCI corresponding to shortened address hA3 and restores the full address before onward transmission.

Should entity H1 not find an association entry for the VPI/VCI of the received cell in its table 815, then it creates a new association and adds it to the table. The channel number that is chosen for the association is an unused channel number or a channel number which has not recently been used. The timestamp of entries in table 815 is checked to find an old entry. The old association is deleted and the new one is created. The new association is signalled to the other entity as a signalling message (as described above) to allow the other entity to correctly decode the header of the cell when it is received.

Message 811 shows entity H2 signalling the allocation of VPI/VCI 0,231 to channel number hFF. Message 812 shows entity H1 signalling the allocation of VPI/VCI 1,33 to channel number hC3.

In the event that both of entities H1, H2 attempt to activate the same channel simultaneously, a conflict develops. It is preferred that one of the entities acts as a master to resolve this conflict. FIG. 12 shows this scenario. H1 signals to H2 (message 830) that it is assigning traffic with VPI/VCI 1,17 to channel number h33. H2 signals to H1 (message 831) that it is assigning traffic with VPI/VCI 0,45 to channel number h33. H1, as master, resolves this dispute by signalling (message 832) that H1 uses h33 and H2 uses h9C. Conflicts can be minimised by programming entities H1, H2 to randomly select one of the channel numbers with the oldest timestamp when they need to select a new channel number, rather than both entities selecting the channel number with the oldest timestamp. For example, H1 and H2 can randomly select one of the ten channel numbers with the oldest timestamp.

Upon receiving a cell from link 20 the receiving entity reformats the contents of the cell to restore the cell to the conventional ATM format, e.g. removing the parts of the modified header which have been distributed along the length of the cell and restoring the proper VPI/VCI address in the header, and restoring the header at the beginning of the cell.

Address Error Performance

Performance of this scheme will now be assessed. All error performance calculations are based on the probability of a burst, $P_B$ effecting the address field over a cell being transported in a 64 k channel. This process is dependent on the length of the burst. For error correction performance, considering a burst length of $I_b$ bits and that each address segment within a cell is $I_{as}$ bits then the burst can start at any bit that will effect the address segment. If the burst length is 80 bits then the burst can begin up to 79 bits prior to the address segment and throughout the entire address segment. Therefore the burst can occur within the bit range:

$$(l_b-1+l_{as}).$$

The probability of 1 error occurring in one address segment, $P_{AE}$, over the transmission bandwidth of the cell with respect to the total bandwidth is given by $$P_{AE} = \frac{(l_b - 1 + l_{as})P_B}{n_{ts} \times n_{ch}} \quad (1)$$

where $n_{ts}$ is the number of time slots in the underlying frame $n_{cb}$ is the number of bits in a hardened cell.

There are five address fields that can withstand one error. Therefore the probability of an address failure, $P_{AF}$, is given by the probability of 2 address errors.

$$P_{AF} = {}^5C_2 P_{AE}^2 Q_{AE}^3 \quad (2)$$

where $Q_{AE}$ is the probability that an error will not occur, i.e. $1-P_{AE}$.

However, $Q_{AE} \approx 1$ and has a negligible be effect on $P_{AF}$. Substituting 1 in 2, and removing $Q_{AE}$ gives $$P_{AF} = {}^5C_2 \left( \frac{(l_b - 1 + l_{as})P_B}{n_{ts} \times n_{cb}} \right)^2$$

For the example system and with $I_b$=80 bits, $P_B$=1E-3, $n_{ts}$=32, $n_{cb}$=416 and $I_{as}$=3 then $$P_{AF}=4.04E-10.$$

Obviously two or more occurrences of $P_{AE}$ will result in a burst error, nevertheless the probability of three or more occurrences of $P_{AE}$ are negligible with respect to two occurrences, i.e. $P_{AF}$.

An ATM cell stream, without the interleaving or distributed resilient addressing can withstand a single bit error within the 5-octet header. Therefore the probability of a cell being effected is $$P_{AF} = \left( \frac{(l_b - 3 + l_{as})P_B}{n_{cb}} \right) = 2.75E-4.$$

This shows that the example scheme provides a performance increase of 6.8E5. At 2 Mbps this is a difference between an uncorrectable error occurring every 0.1 seconds for standard ATM and one every 18 hours for the example scheme.

The error correction performance is determined by the Reed-Solomon code's ability to detect errors and with the additional CRC. The RS code may not detect any errors, therefore the error detection ability is increased with the CRCs additional coding above the error correction performance calculated above. The two, 4-bit CRCs each have an error performance of $2^{-4}$, combined with probability of a burst error introduced by the RS code incorrectly resolving an error is $$4.04E-10\times 2^{-4}=2.52E-11$$

The error correction performance of standard ATM is $$2.75E-4\times 2^{-8}=1.07E-6$$

For standard ATM the occurrence of an undetected error is once every 25 seconds, whereas the hardened scheme has an undetected error event every 12 days. Considering the standard ATM stream, it is unlikely that the switch will provide an ATM connection because of the vast number of errors. The example scheme, however, should provide continuous service because it does not rely on the addressing scheme to provide synchronisation.

Figure 13:
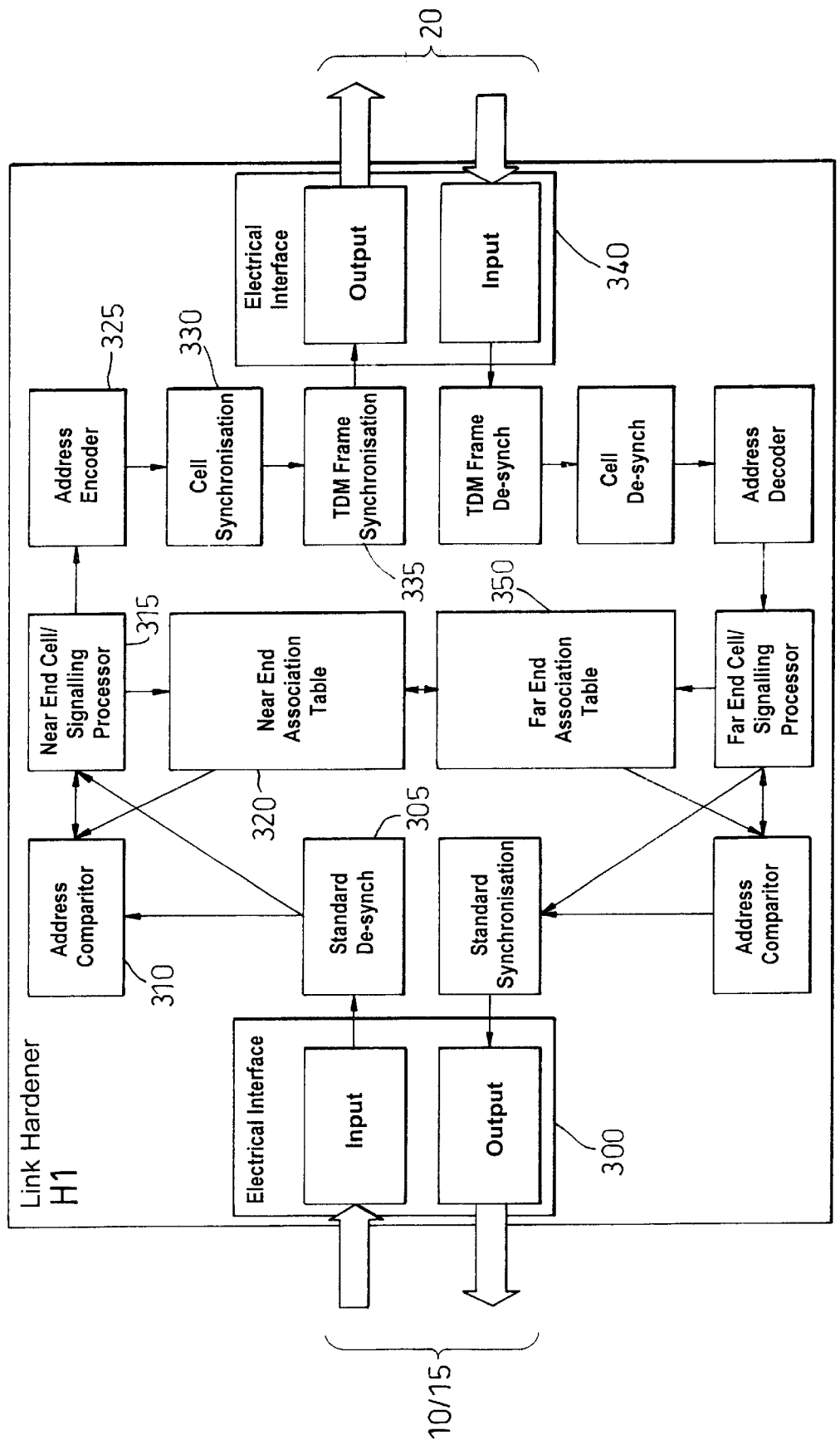
FIG. 13 shows one of the link hardening devices of FIG. 1 in more detail.

FIG. 13 shows one of the link hardening devices H1, H2 in more detail. An electrical or optical interface 300 is provided for coupling to an ATM or other suitable transmission link. A de-synch block 305 delineates the incoming bit stream into cells. For each cell, the address comparator 310, near end association table 320 and signalling processor 315 perform the tasks of inspecting the address of the received ATM cell, checking whether that address has an associated address for use on link 20, and assigning the address, as previously described with reference to FIG. 11. Address encoder 325 and cell synchronisation 330 blocks format the cell in the manner shown in FIG. 7 and TDM frame synchronisation stores the formatted cells in a buffer and assembles parts of the buffered cells into the slotted frame structure shown in FIG. 3, also adding suitable synchronisation to the TDM frame. An output interface 340 couples to link 20, via a suitable RF modulation device. The other chain of blocks in unit H1 perform the reverse operation, receiving the TDM frame from link 20, extracting the cells, translating the modified address into the correct ATM address by reference to far end association table 350, and formatting the cell for onward transmission via interface 300. The two association tables 320, 350 are typically implemented as regions of a memory device, and a single shared table may be used in place of the two separate tables shown here.

What is claimed is:

1. A method of transmitting data packets over a communications link in an interleaved manner, the link comprising a series of time-division multiplexed (TDM) frames, each frame comprising a plurality of time slots, a time slot being shorter than a data packet, the method comprising:
   receiving data packets for transmission over the link;
   for each data packet, transmitting the data packet over a series of the TDM frames, by dividing the data packet into portions and using one time slot in each of the series of frames to transmit one of the portions such that the same time slot in each of the series of frames is used for each of the portions of a particular data packet.

2. The method according to claim 1, further comprising beginning to transmit a received data packet when there is a free time slot in a frame, such that different ones of the data packets begin in different TDM frames.

3. The method according to claim 1, wherein the received data packet has a packet header, and the packet is allocated a modified header for use over the communications link.

4. The method according to claim 3, wherein the received packet header has an address and the modified header has a shorter address than the address in the received packet header.

5. The method according to claim 3, wherein the modified header is split into a plurality of parts which are distributed across the length of the transmitted packet.

6. The method according to claim 3, wherein error protection is included for the modified header and the error protection is distributed across the length of the transmitted packet.

7. The method according to claim 6, wherein the error protection comprises error detection and error correction.

8. The method according to claim 7 wherein the error detection includes two independent error detection codes for the header.

9. The method according to claim 5 wherein error protection is included for the modified header and the error protection is spaced, within the transmitted packet, from the other parts of the modified header by payload parts of the packet.

10. The method according to claim 5, wherein the modified header is allocated by referring to a store of association information, the association information associating the packet header to a modified packet header.

11. The method according to claim 10, wherein if no association information exists, a new association is created.

12. The method according to claim 11, wherein the modified header is selected from a pool of unused headers.

13. The method according to claim 11, wherein the modified header is a recently unused header.

14. The method according to claim 13, wherein the association information includes a timestamp and the recently unused header is chosen according to the timestamp.

15. The method according to claim 10, wherein there is a transmitting/receiving entity at each end of the communications link and one of the entities acts as a master to resolve allocation of association information.

16. The method according to claim 3, wherein association information for associating the packet header and modified packet header is transmitted across the link to a receiving entity.

17. The method according to claim 16, wherein the association information is stored at the receiving entity for use with processing received packets from the link.

18. The method according to claim 16, wherein the association is transmitted across a dedicated signalling channel.

19. The method according to claim 1, wherein the transmitted packet includes synchronisation information to allow a receiving entity at a receiving end of the communications link to determine boundaries between transmitted packets on the link.

20. The method according to claim 19, wherein the synchronisation information is distributed across the length of the transmitted packet.

21. The method according to claim 1 further comprising including synchronisation information in the frames, and varying the position of the synchronisation information within the frames.

22. The method according to claim 21 wherein, if the synchronisation information occupies a time slot that should be carrying a portion of a data packet, that portion of the data packet is moved to occupy a predetermined alternative time slot in the frame.

23. The method according to claim 1 wherein the data packets are received over a second communications link, and the second communications link experiences a lower error rate compared with the communications link on which the packets are transmitted.

24. The method according to claim 1 wherein the communications link is a wireless link.

25. The method according to claim 1 wherein the received data packets are ATM cells.

26. Apparatus for transmitting data packets over a communications link in an interleaved manner, the apparatus comprising:

a receiver for receiving data packets for transmission over the link;

a transmitting unit for generating a series of time-division multiplexed (TDM) frames, each frame comprising a plurality of time slots, a time slot being shorter than a data packet, the unit being arranged for each data packet, to transmit the data packet over a series of the TDM frames, by dividing the data packet into portions and using one time slot in each of the series of frames to transmit one of the portions such that the same time slot in each of the series of frames is used for each of the portions of a particular data packet.

27. Apparatus for formatting data packets which are intended for transmission over a communications link in an interleaved manner, the apparatus comprising a formatting unit for receiving data packets which are intended for transmission over the link and generating a series of time-division multiplexed (TDM) frames, each frame comprising a plurality of time slots, a time slot being shorter than a data packet, the unit being arranged for each data packet, to allocate the data packet to a series of the TDM frames, by dividing the data packet into portions and using one time slot in each of the series of frames to transmit one of the portions such that the same time slot in each of the series of frames is used for each of the portions of a particular data packet.

28. A method of transmitting data packets over a communications link, the method comprising:

receiving a data packet for transmission over the link, the received data packet having a packet header with an address;

allocating a modified header to the packet for use over the communications link, the modified header having a shorter address than the address in the received packet header; and, transmitting the data packet over the communications link.

29. Apparatus for transmitting data packets over a communications link comprising:

a receiver for receiving a data packet for transmission over the link, the received data packet having a packet header with an address;

a formatting unit for allocating a modified header to the packet for use over the communications link, the modified header having a shorter address than the address in the received packet header; and, a transmitter for transmitting the data packet over the communications link.

30. Apparatus for formatting data packets which are intended for transmission over a communications link comprising a formatting unit for receiving a data packet for transmission over the link, the received data packet having a packet header with an address, and allocating a modified header to the packet for use over the communications link, the modified header having a shorter address than the address in the received packet header.

31. A method of transmitting a data packet over a communications link, the method comprising transmitting the data packet over the communications link in a form in which address information for the packet is split into a plurality of parts, which parts are distributed across the length of the packet and which are separated by payload parts of the packet.

32. Apparatus for transmitting a data packet over a communications link comprising: transmitting the data packet over the communications link in a form in which address information for the packet is split into a plurality of parts, which parts are distributed across the length of the packet and which are separated by payload parts of the packet.

* * * * *